United States Patent
Ozawa et al.

(10) Patent No.: US 7,619,705 B2
(45) Date of Patent: Nov. 17, 2009

(54) TRANSFLECTIVE LIQUID CRYSTAL DISPLAY DEVICE WITH NO RETARDATION LAYER ON THE TRANSMISSIVE REGIONS, MANUFACTURING METHOD THEREOF AND ELECTRONIC APPARATUS

(75) Inventors: Kinya Ozawa, Suwa (JP); Masakatsu Higa, Chino (JP); Chiyoaki Iijima, Ima (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/076,073

(22) Filed: Mar. 13, 2008

(65) Prior Publication Data

US 2008/0212001 A1 Sep. 4, 2008

Related U.S. Application Data

(63) Continuation of application No. 11/637,061, filed on Dec. 12, 2006, now Pat. No. 7,474,367, which is a continuation of application No. 10/385,749, filed on Mar. 12, 2003, now Pat. No. 7,218,363.

(30) Foreign Application Priority Data

Apr. 2, 2002 (JP) ............................... 2002-100379
Nov. 27, 2002 (JP) ............................... 2002-343925

(51) Int. Cl.
G02F 1/1335 (2006.01)
(52) U.S. Cl. ........................................ 349/114; 349/117
(58) Field of Classification Search ................... 349/114
See application file for complete search history.

(56) References Cited

U.S. PATENT DOCUMENTS

| | | | |
|---|---|---|---|
| 6,016,178 A | 1/2000 | Kataoka et al. | |
| 6,084,647 A | 7/2000 | Hatano et al. | |
| 6,175,399 B1 | 1/2001 | Mitsui et al. | |
| 6,281,952 B1 | 8/2001 | Okamoto et al. | |
| 6,320,629 B1 | 11/2001 | Hatano et al. | |
| 6,452,654 B2 * | 9/2002 | Kubo et al. | 349/114 |
| 6,483,559 B1 | 11/2002 | Hiraki et al. | |
| 6,559,916 B1 | 5/2003 | Urabe et al. | |
| 6,570,634 B2 | 5/2003 | Kim | |
| 6,621,543 B2 | 9/2003 | Moon | |
| 6,654,087 B2 | 11/2003 | Song et al. | |
| 6,661,484 B1 | 12/2003 | Iwai et al. | |

(Continued)

FOREIGN PATENT DOCUMENTS

JP A-06-347794 12/1994

(Continued)

*Primary Examiner*—Richard H Kim
(74) *Attorney, Agent, or Firm*—Oliff & Berridge, PLC

(57) ABSTRACT

An upper polarizing plate is provided on the outer surface of an upper substrate, and a lower polarizing plate is provided on the outer surface of a lower substrate. Also, a retardation layer having a phase shift of a quarter wavelength, and a protective layer are provided in turn only on reflective display regions of the inner surface of the lower substrate so that with no voltage applied, the phase shifts of a liquid crystal layer in transmissive display regions and the reflective display regions are set to a half wavelength and a quarter wavelength, respectively. Therefore, the present invention provides a transflective liquid crystal display device having enhanced display brightness in a transmission mode and excellent visibility.

20 Claims, 11 Drawing Sheets

U.S. PATENT DOCUMENTS

| | | |
|---|---|---|
| 6,704,078 B2 | 3/2004 | Ha et al. |
| 6,707,519 B1 | 3/2004 | Okumura et al. |
| 6,753,938 B2 | 6/2004 | Yamada et al. |
| 6,771,334 B2 | 8/2004 | Kubota et al. |
| 6,831,721 B2 | 12/2004 | Maeda et al. |
| 6,862,058 B2 | 3/2005 | Ikeno et al. |
| 6,909,481 B2 | 6/2005 | Maeda et al. |
| 7,015,995 B2 | 3/2006 | Ikeno et al. |
| 2002/0171792 A1 | 11/2002 | Kubota et al. |

FOREIGN PATENT DOCUMENTS

| | | |
|---|---|---|
| JP | A-09-033956 | 2/1997 |
| JP | A-09-146124 | 6/1997 |
| JP | A-10-153773 | 6/1998 |
| JP | A-10-227998 | 8/1998 |
| JP | A-10-319235 | 12/1998 |
| JP | A-11-052362 | 2/1999 |
| JP | A-11-242226 | 9/1999 |
| JP | A-2000-162581 | 6/2000 |
| JP | A-2000-267081 | 9/2000 |
| JP | A-2000-305099 | 11/2000 |
| JP | A-2000-356771 | 12/2000 |
| JP | A-2001-221995 | 8/2001 |
| JP | A-2001-222009 | 8/2001 |
| JP | B2-3235102 | 9/2001 |
| JP | A-2002-082331 | 3/2002 |
| JP | A-2002-107724 | 4/2002 |
| JP | A-2003-057638 | 2/2003 |
| JP | A-2003-066473 | 3/2003 |
| KR | 2001-0066252 | 7/2001 |

* cited by examiner

TRANSFLECTIVE LIQUID CRYSTAL DISPLAY DEVICE WITH NO RETARDATION LAYER ON THE TRANSMISSIVE REGIONS, MANUFACTURING METHOD THEREOF AND ELECTRONIC APPARATUS

This is a Continuation of application Ser. No. 11/637,061 filed Dec. 12, 2006, which in turn is a Continuation of application Ser. No. 10/385,749 filed Mar. 12, 2003. The disclosure of the prior applications is hereby incorporated by reference herein in its entirety.

BACKGROUND OF THE INVENTION

1. Field of Invention

The present invention relates to a liquid crystal display device, a manufacturing method therefor, and an electronic apparatus. Particularly, the present invention relates to a construction of a transflective liquid crystal display device with excellent visibility, which is capable of a sufficiently bright display in both a reflective mode and transmissive mode.

2. Description of Related Art

The related art includes a liquid display device to enable a display to be viewed in the light by using external light, like in a previous related art reflective liquid crystal display device, and to enable a display to be viewed in the dark by using an internal light source. The liquid crystal display device uses a display system for both a reflective display and transmissive display so that the display system can be switched to the reflective display or transmissive display according to ambient brightness, thereby permitting a clear display while decreasing power consumption even in a dark environment. This type of liquid crystal display device is hereinafter referred to as a "transflective liquid crystal display device,". An exemplary related art transflective liquid crystal display device includes a reflective film that includes a metal film of aluminum or the like and having light transmission apertures on the inner surface of a lower substrate so as to function as a transflective film. The liquid crystal display device includes the metal film provided on the inner surface of the lower substrate, and thus has the effect of reducing or preventing the influence of parallax due to the thickness of the lower substrate, and reducing or color mixing, particularly, in a structure including a color filter. The liquid crystal-side surface of each of substrates, which constitute a liquid crystal display device, is hereinafter referred to as the "inner surface", and the opposite surface is hereinafter referred to as the "outer surface".

FIG. 7 shows an example of a transflective liquid crystal display device including this type of transflective film.

In a liquid crystal display device 100, a liquid crystal layer 103 is sandwiched between a pair of glass substrates 101 and 102, a transflective film 104 having apertures 104a, and a transparent electrode 108 comprising a transparent conductive film of indium tin oxide (hereinafter "ITO") are laminated on the inner surface of the lower substrate 101, and an alignment film 107 is formed to cover the transparent electrode 108. On the other hand, a transparent electrode 112 including a transparent conductive film of ITO or the like is formed on the inner surface of the upper substrate 102, and an alignment film 113 is formed to cover the transparent electrode 112. Also, two retardation plates 118 and 119 (functioning as a quarter-wave plate 120) and an upper polarizing plate 114 are disposed on the outer surface of the upper substrate 102 in that order from the upper substrate 102, and a quarter-wave plate 115 and a lower polarizing plate 116 are provided on the outer surface of the lower substrate 101 in that order.

Furthermore, a back light 117 (illumination device) including a light source 122, a light guide plate 123 and a reflective plate 124 is disposed below the lower polarizing plate 116. Each of the quarter-wave plates 115 and 120 is capable of changing linearly polarized light to substantially circularly polarized light within a certain wavelength region.

The display principle of the transflective liquid crystal display device 100 shown in FIG. 7 is described below with reference to FIG. 8. FIG. 8 shows only components necessary for describing the display principle of the liquid crystal display device shown in FIG. 7.

First, in a dark display, a voltage is applied to the liquid crystal layer 103 (on state) to create a state in which the liquid crystal layer 103 has no phase shift. In a reflective display, light incident on the top of the upper polarizing plate 114 passes through the upper polarizing plate 114 to become linearly polarized light perpendicular to FIG. 8 on the assumption that the transmission axis of the upper polarizing plate 114 is perpendicular to the drawing. Further, the linearly polarized light passes through the quarter-wave plate 120 to become counterclockwise circularly polarized light, which then passes through the liquid crystal layer 103. Then, the circularly polarized light is reflected by the surface of the transflective film 104 provided on the lower substrate 101 to become clockwise circularly polarized light due to inversion of the rotation direction. Furthermore, the circularly polarized light passes through the liquid crystal layer 103, and then passes through the quarter-wave plate 120 to become linearly polarized light parallel to FIG. 8. Since the upper polarizing plate 114 has the transmission axis perpendicular to the FIG. 8, reflected light is not returned to the outside (observation side) due to absorption by the upper polarizing plate 114, thereby causing a dark display.

On the other hand, in the transmissive display, light emitted from the back light 117 passes through the lower polarizing plate 116 to become linearly polarized light parallel to the drawing on the assumption that the transmission axis of the lower polarizing plate 116 is parallel to the drawing. Then, the linearly polarized light passes through the quarter-wave plate 115 to become clockwise circularly polarized light, which then passes through the liquid crystal layer 103. Then, the clockwise circularly polarized light passes through the quarter-wave plate 120 to become linearly polarized light parallel to FIG. 8, which is then absorbed by the upper polarizing plate 114 to cause a dark display in the same manner as the reflective mode.

In a light display with no voltage applied to the liquid crystal layer 103 (off state), a phase shift is set to a quarter wavelength by a birefringence effect of the liquid crystal layer 103. In the reflective display, light is incident on the upper polarizing plate 114 from above, and passes through the upper polarizing plate 114 and the quarter-wave plate 120 to become counterclockwise circularly polarized light, which then passes through the liquid crystal layer 103. Then, the circularly polarized light reaches the surface of the transflective layer 104 to become linearly polarized light parallel to FIG. 8. Furthermore, the linearly polarized light is reflected by the surface of the transflective layer 104, and then passes through the liquid crystal layer 103 to become counterclockwise circularly polarized light, which then passes through the quarter-wave plate 120 to become linearly polarized light perpendicular to FIG. 8. Since the upper polarizing plate 114 has the transmission axis perpendicular to FIG. 8, the reflected light passes through the upper polarizing plate 114 and returns to the outside (observation side), causing a light display.

On the other hand, in the transmissive display, light emitted from the back light 117 passes through the lower polarizing plate 116 and the quarter-wave plate 115 to become clockwise circularly polarized light. Then, the circularly polarized light passes through the liquid crystal layer 103 to become linearly polarized light perpendicular to FIG. 8. The linearly polarized light perpendicular to the drawing passes through the quarter-wave plate 120 to become counterclockwise circularly polarized light. Since the upper polarizing plate 114 has the transmission axis perpendicular to the drawing, only linearly polarized light perpendicular to the drawing of the counterclockwise circularly polarized light passes through the upper polarizing plate 114 to cause a light display.

A related art apparatus is disclosed in Patent Publication No. 3235102.

SUMMARY OF THE INVENTION

As described above, the liquid crystal display device 100 shown in FIGS. 7 and 8 is capable of producing a visible display regardless of the presence of external light, but has the problem of insufficient light in a transmissive display in comparison to a reflective display.

A cause of this problem is that, according to the display principle described above with reference to FIG. 8, in a transmissive light display, light incident on the upper polarizing plate 114 after passing through the liquid crystal layer 103 and the quarter-wave plate 120 (the retardation plates 118 and 119) is circularly polarized light, and thus about a half of the circularly polarized light is absorbed by the upper polarizing plate 114 and does not contribute to a display.

Another cause is that a part of light emitted from the back light 117 does not pass through the apertures 104a of the transflective layer 104 and is reflected by the back of the transflective layer 104 to become counterclockwise circularly polarized light due to the inversion of the rotation direction, and the counterclockwise circularly polarized light passes through the quarter-wave plate 115 to become linearly polarized light perpendicular to the drawing. The linearly polarized light is absorbed by the lower polarizing plate 116 having the transmission axis parallel to the drawing. Namely, if a part of the light emitted from the back light 117 and not passing through the apertures 104a passes through the lower polarizing plate 116 and returns to the back light 117 without being absorbed by the lower polarizing plate 116, the return light is again emitted to the liquid crystal cell to effectively improve the brightness of the back light 117. However, the light not passing through the apertures 104a is actually reflected by the back of the transflective layer 104 and then almost completely absorbed by the lower polarizing plate 116, thereby failing to reuse the light.

Furthermore, the liquid crystal display device shown in FIG. 7 requires pluralities of retardation plates and polarizing plates to be bonded to both outer surfaces of a pair of substrates with a liquid crystal layer sandwiched therebetween, and thus has the problems of complicating the construction, increasing the manufacturing cost, and failing to thin the liquid crystal display device.

Accordingly, the present invention addresses or solves the above and/or other problems, and provides a transflective liquid crystal display device capable of both a reflective display and a transmissive display, and particularly a liquid crystal display device having excellent visibility and enhanced display brightness in a transmissive mode, and a method of manufacturing the same. The present invention also provides an electronic apparatus including a liquid crystal display device having excellent visibility.

In order to address or achieve the above, a transflective liquid crystal display device of the present invention includes a liquid crystal layer sandwiched between opposed upper and lower substrates each of which has dot regions each having a transmissive display region and a reflective display region, an upper polarizing plate provided on the outer surface of the upper substrate, a lower polarizing plate provided on the outer surface of the lower substrate, and a reflective layer and retardation layer provided on the reflective display regions of the inner surface of the lower substrate in that order from the substrate side. With one of a selective voltage applied or a non-selective voltage applied, a phase difference of the liquid crystal layer in the transmissive display regions is greater than that in the reflective display regions.

Of some causes of a decrease in brightness of the transmissive display, in order to address or solve the cause that light emitted from a back light is reflected by the back of a transflective layer, and absorbed by a lower polarizing plate, thereby failing to reuse the light, the applicant filed a liquid crystal display device comprising a retardation layer (quarter wavelength) provided only on transmissive display regions of the inner surface of a lower substrate. In this construction, the retardation plate (quarter-wave plate) need not be provided between the lower substrate and the back light so that light reflected from the back of the transflective layer passes through the lower polarizing plate without any change, is reflected by a reflective plate of the back light, and then again enters the liquid crystal panel, thereby permitting the effective utilization of light from the back light. However, in this construction, the lower retardation plate is provided only on the inner side of the liquid crystal panel without changes in the constructions of an upper retardation plate and a polarizing plate, and changes in the display principle of a transmissive display. Therefore, the problem of darkening the transmissive display due to the absorption of about a half of circularly polarized light by the upper polarizing plate, and the problem of complicating the structure to increase the number of necessary components remain unsolved.

Therefore, the inventors conceived a construction opposite to the above-described construction, i.e., a construction in which a retardation layer is provided only on the reflective display regions of the inner surface of the lower substrate, and the phase difference of the liquid crystal layer in the transmissive display regions is greater than that in the reflective display regions so as to compensate a phase difference applied only to the reflective display regions by the retardation layer. In this construction, the setting conditions, such as the phase differences of the retardation layer and the liquid crystal layer, can be set to permit a transmissive display using only linearly polarized light, thereby eliminating the need for the upper retardation plate as well as the lower retardation plate. As a result, it is possible to address or resolve the problem of a related art construction in which about a half of circularly polarized light is absorbed by the upper polarizing plate to darken the transmissive display, thereby lightening the transmissive display as compared with the related art construction. It is also possible to simplify the structure and thin the display device, as compared with a conventional display device. The display principle of the liquid crystal display device of the present invention is described below in the Detailed Description of Preferred Embodiments section of this application.

As a method of setting the phase difference of the liquid crystal layer in the transmissive display region to be greater than that in the reflective display region, at least one of the thickness d of the liquid crystal layer and the refractive index anisotropy $\Delta n$ of the liquid crystal in the transmissive display regions may be different from that in the reflective display regions because a phase difference (retardation) is represented by the product $\Delta n \cdot d$ of the thickness d of the liquid crystal layer and the refractive index anisotropy $\Delta n$ of the liquid crystal. However, it is difficult to actually greatly differentiate the refractive index anisotropy $\Delta n$ of the liquid crystal in the transmissive display regions from that in the reflective display region. Thus, the thickness of the liquid crystal layer in the transmissive display regions is easily set to be greater than that in the reflective display regions.

The retardation layer gives transmitted light a phase shift of about a quarter wavelength, and thus the thickness of the liquid crystal layer in the transmissive display region is preferably about twice as large as that in the reflective display region, so that with one of the selective voltage applied and the non-selective voltage applied, the phase shifts in both the reflective display regions and the transmissive display regions are substantially zero, and with the other voltage applied, the phase shifts of the liquid crystal in the reflective display regions and the transmissive display regions are about a quarter wavelength and a half wavelength, respectively.

The "phase shift of a quarter wavelength" means that when linearly polarized light is incident on an optical isomer (for example, the liquid crystal or retardation plate), emitted light becomes circularly polarized light, and a "phase shift of a half wavelength" means that emitted light becomes linearly polarized light perpendicular to incident linearly polarized light. A "phase shift of 0" or "no phase shift" means that emitted light becomes linearly polarized light parallel to incident linearly polarized light.

In this construction, in transmission through the upper polarizing plate, linearly polarized light in the reflective display can be put into the same polarized state as that in the transmissive display, and thus the phase shift in the reflective display regions can be set to substantially the same as that in the transmissive display regions. It is thus possible to enhance the utilization efficiency of light to permit a construction capable of a brightest transmissive display. It is also possible to obtain a display with a high contrast.

The retardation layer may include a polymer liquid crystal.

In this construction, the retardation layer can be relatively easily formed on the inner surface of a substrate.

Also, an insulating layer is preferably provided on the retardation layer.

In the liquid crystal display device of the present invention, particularly when the retardation layer includes the polymer liquid crystal, the insulating layer provided on the retardation layer functions as a protective film to prevent deterioration of the retardation layer. In the construction of the present invention, the retardation layer is provided only in the reflective display region, and thus the insulating film formed on the retardation layer permits the realization of a structure in which the thickness of the liquid crystal layer in the reflective display region is smaller than that in the transmissive display region. For example, the thickness of the liquid crystal layer in the transmissive display region can easily be set to be about twice as large as that in the reflective display region by controlling the thickness of the insulating layer.

Like the above-described insulating layer, a liquid crystal thickness controlling layer is preferably provided on the retardation layer, to control the thicknesses of the liquid crystal layer in the transmissive display region and reflective display region.

In this construction, by controlling the thickness of the liquid crystal layer thickness controlling layer, it is possible to easily realize a structure in which the thickness of the liquid crystal layer in the reflective display region is smaller than that in the transmissive display region. For example, the thickness of the liquid crystal layer in the transmissive display region can easily be set to about twice as large as that in the reflective display region.

The retardation layer may function as the liquid crystal layer thickness controlling layer to control the thicknesses of the liquid crystal layer in the transmissive display region and reflective display region.

Namely, the retardation layer is provided only in the reflective display region, and thus the retardation layer can be caused to function as the liquid crystal layer thickness controlling layer to decrease the thickness of the liquid crystal layer in the reflective display region by controlling the thickness of the retardation layer. In this construction, the liquid crystal layer thickness controlling layer including the insulating layer or the like need not be provided separately, thereby simplifying the device structure and manufacturing process.

The rubbing axis of the upper substrate is preferably perpendicular or parallel to the transmission axis of the upper polarizing plate so that with the non-selective voltage applied, the liquid crystal molecules of the liquid crystal layer are twisted by about 90° between the upper and lower substrates.

In this construction, with the selective voltage applied or the non-selective voltage applied, the phase shift in the transmissive display region is a half wavelength or 0 due to rotatory performance. Namely, the transmissive display is a TN (Twisted Nematic) rotatory mode display using linearly polarized light, thereby enhancing the utilization efficiency of light, permitting a bright display and widening a viewing angle.

In this construction, the retardation of the liquid crystal layer in the reflective display region is preferably 130 nm to 340 nm.

In the construction including the liquid crystal layer having such a small retardation, with the selective voltage applied or the non-selective voltage applied, the phase shift of the liquid crystal layer in the reflective display region is a quarter wavelength or 0 due to insufficient optical rotation. Therefore, the visibility of the reflective display can be sufficiently secured. The reason to preferably set the retardation in the above-described numerical range is described below.

Furthermore, a reflective polarizing plate having a transmission axis substantially parallel to the transmission axis of the lower polarizing plate is preferably provided on the outer surface of the lower polarizing plate.

When the reflective polarizing plate is not provided, a part of the light emitted from the back light may be converted to linearly polarized light and absorbed by the lower polarizing plate. However, in this construction, the linearly polarized light is reflected by the reflective polarizing plate to return to the back light, thereby permitting the reutilization of the light for the transmissive display. The reason why the linearly polarized light can pass through the reflective polarizing plate and contribute to a display is that the linearly polarized light is repeatedly reflected by the reflective polarizing plate to change the polarizing axis direction, and is thus converted to linearly polarized light in a direction different from the initial direction. In this construction, the transmissive display can be further brightened.

A method of manufacturing a liquid crystal display device of the present invention comprises the steps of forming a reflective layer on a region of a lower substrate, which corresponds to a reflective display region, forming in turn a polymer liquid crystal layer and a photosensitive resin layer, patterning the photosensitive resin layer by a photolithography process, and then etching the polymer liquid crystal layer through the patterned photosensitive resin layer used as a mask to locally leave the polymer liquid crystal layer, forming a retardation layer including the polymer liquid crystal layer on the reflective layer.

Another method of manufacturing a liquid crystal display device of the present invention includes: forming a reflective layer on a region of a lower substrate, which corresponds to a reflective display region, forming a layer including a liquid crystalline monomer, locally optically polymerizing the liquid crystalline monomer by a photolithography process to form a liquid crystalline monomer polymer, forming a retardation layer including the liquid crystalline monomer polymer above the reflective layer.

The "liquid crystalline monomer" means a monomer that forms a liquid crystal phase by itself, or a monomer that does not form a liquid crystal phase by itself and does not lose the crystalline state of a mixture when being mixed in a liquid crystal phase.

Any of the methods can relatively easily realize a structure in which the retardation layer is locally formed only in the reflective display region by a related art photolithography process. For example, the photosensitive resin layer may be formed after the retardation layer is formed, and then patterned by the photolithography process to leave the photosensitive resin layer above the retardation layer. This method can easily realize a structure in which the thickness of the liquid crystal layer in the reflective display region is smaller than that in the transmissive display region.

An electronic apparatus of the present invention includes the above-described liquid crystal display device of the present invention.

In this construction, the electronic apparatus including a liquid crystal display part exhibiting high brightness in a transmissive display mode and excellent visibility can be provided.

The above-described operation and other advantages of the present invention will be made clear from the description of the exemplary embodiments described below.

DETAILED DESCRIPTION OF PREFERRED EMBODIMENTS

Exemplary embodiments of the present invention are described below with reference to the drawings.

First Exemplary Embodiment

A first exemplary embodiment of the present invention is described below with reference to FIGS. 1 and 2.

Figure 1:
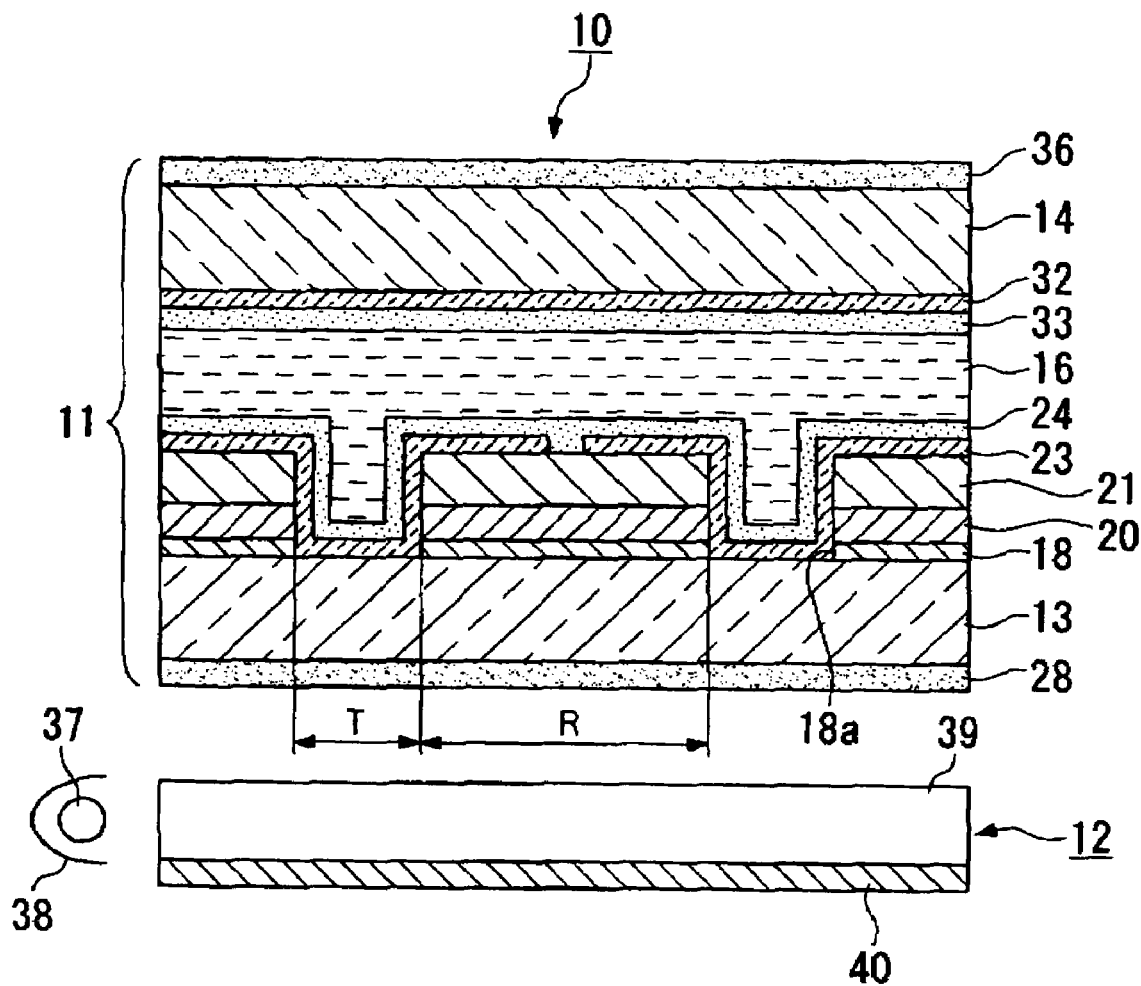
FIG. 1 is a sectional view showing the schematic construction of a liquid crystal display device according to a first exemplary embodiment of the present invention.
Figure 2:
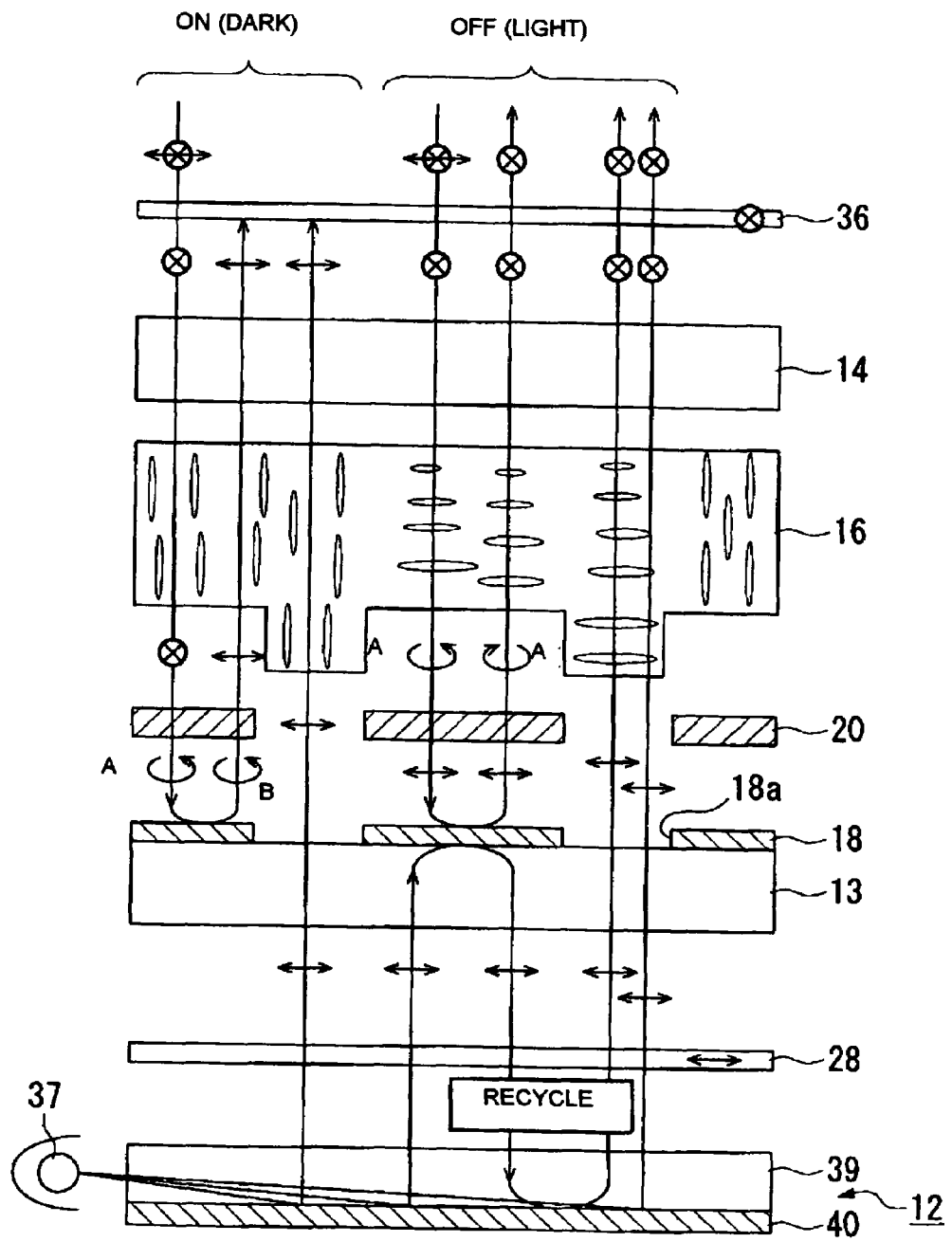
FIG. 2 is a schematic showing only components necessary illustrating the display principle of the liquid crystal display device shown in FIG. 1.

FIG. 1 is a sectional view showing the schematic construction of a liquid crystal display device according to this exemplary embodiment, and FIG. 2 is a schematic showing only components necessary illustrating the display principle of the liquid crystal display device. This exemplary embodiment is an example of a transflective color liquid crystal display device in an active matrix system. In all of the drawings, the thickness and dimensional ratio of each component are appropriately changed to make each drawing more easily viewable.

As shown in FIG. 1, a liquid crystal display device 10 of this exemplary embodiment includes a liquid crystal cell 11 and a back light 12 (illumination device). The liquid crystal cell 11 comprises a lower substrate 13 and upper substrate 14, which are opposed to each other, and a liquid crystal layer 16 comprising a TN (Twisted Nematic) liquid crystal or the like, which is sealed in the space between the upper substrate 14 and the lower substrate 13. The back light 12 is disposed at the back (the outer side of the lower substrate 13) of the liquid crystal cell 11.

Also, a transflective layer 18 including a metal film having high reflectance, such as aluminum, silver, an alloy thereof, or the like, is formed on the inner side of the lower substrate 13 including a light transmitting material, such as glass or plastic. The transflective layer 18 has apertures 18a provided for respective pixels to transmit light emitted from the back light 12. In the transflective layer 18, the regions each actually having the metal film include reflective display regions R, and the apertures 18a comprise transmissive display regions T.

In each of the reflective display regions R, a retardation layer 20 and a protective layer 21 are laminated on the transflective layer 18 in that order from the substrate side. The retardation layer 20 includes, for example, a polymer liquid crystal, and applies a phase shift of a quarter wavelength of visible light incident on the liquid crystal cell 11. The protective layer 21 includes, for example, an insulating film of an acrylic photosensitive resin, or the like.

The retardation layer 20 and the protective layer 21 can be formed by, for example, the following two exemplary methods.

In the first exemplary method, an alignment film material, SE-3140 (trade name, produced by Nissan Chemical Industries, Ltd.) is first coated on the transflective layer 18 formed on the substrate by a spin coating process or flexographic printing process, burned, and then rubbed. Then, a polymer liquid crystal solution is coated on the alignment film by a spin coating process (for example, for 30 seconds at a rotation speed of 700 rpm). The polymer liquid crystal solution used is, for example, an 8% solution of PLC-7023 (trade name, produced by Asahi Denka Kogyo K. K.), and the solvent used is a mixture of cyclohexanone and methyl ethyl ketone. The solution also has an isotropic transition temperature of 170° C., and a refractive anisotropy $\Delta n$ of 0.21.

Next, the polymer liquid crystal layer is pre-baked at 80° C. for 1 minute, further heated for 30 minutes at 180° C. higher than the isotropic transition temperature (170° C.) of the polymer liquid crystal, and then gradually cooled to align the polymer liquid crystal. As a result of actual production under these conditions, the inventors achieved a thickness of 630 nm, and a retardation of 133 nm.

Next, an acrylic photosensitive resin NN-525 (trade name, produced by JSR Co., Ltd.) is coated as a material for the protective layer by a spin coating process (for example, 30 seconds at a rotation speed of 700 rpm). In this case, the thickness is 2.3 μm. Next, the protective layer is pre-baked at 80° C. for 3 minutes, and exposed to light through a photomask (for example, an exposure strength of 140 mJ/cm$^2$, measured by an ultraviolet actinometer having sensitivity at 350 nm), and then developed by dipping in an alkaline developer at room temperature for 90 seconds to leave the protective layer only in the reflective display regions. Since the acrylic photosensitive resin is a negative type, the photomask must be formed so that the reflective display regions are exposed to light.

Next, in order to completely cure the protective layer, post-curing is performed with an exposure strength of 2000 mJ/cm$^2$. With an exposure strength of 1000 mJ/cm$^2$ or less, the protective layer peels in development of the polymer liquid crystal in a next step, while with an exposure strength of 1300 mJ/cm$^2$ or more, no problem occurs. Therefore, the exposure strength is set to 2000 mJ/cm$^2$. Then, the polymer liquid crystal is etched by dipping in an etchant comprising N-methyl-2-pyrolizinone at room temperature for 30 minutes. Then, the substrate is dried at 80° C. for 3 minutes to form the retardation layer 20 comprising the polymer liquid crystal and the protective layer 21 including the acrylic photosensitive resin.

In the second method, an alignment film is formed on the substrate by the same method as in the second method, and then a solution of UV curable liquid crystal, UCL-008-K1 (trade name, produced by Dainippon Ink And Chemicals, Incorporated), as a liquid crystalline monomer is coated on the substrate by the spin coating process (for example, 30 seconds at a rotational speed of 700 rpm). The liquid crystalline monomer solution used is a 25% diluted solution in a mixed solvent containing N-methyl-2-pylorizinone and r-butyrolactone, and has an isotropic transition temperature of 69° C. and a refractive index isotropy $\Delta n$ of 0.20.

Next, the liquid crystalline monomer is dried at 60° C. for 5 minutes, heated for 5 minutes at 90° C. higher than the isotropic transition temperature (69° C.), and then gradually cooled to align the crystalline monomer. As a result of actual production under these conditions, the inventors achieved a thickness of 650 nm. Next, the liquid crystalline monomer is exposed to light through a photomask (for example, an exposure strength of 3000 mJ/cm$^2$) to locally optically polymerize the crystalline monomer, and then developed by dipping in an alkaline developer or a ketone-based organic solvent for 60 seconds to leave the liquid crystalline monomer polymer only in the reflective display regions. Consequently, the retardation layer 20 including the liquid crystalline monomer polymer is formed. Then, the protective layer 21 may be formed on the retardation layer 20 by the same method as in the first method.

In this way, in the liquid crystal display device 10 of this exemplary embodiment, the retardation layer 20 and the protective layer 21 are provided only in the reflective display regions R to form steps between the reflective display regions R and the transmissive display regions T. Also, pixel electrodes 23 including a transparent conductive film of ITO or the like are formed along the steps, and an alignment film 24 including polyimide or the like is formed to cover the pixel electrodes 23. In this exemplary embodiment, the lower substrate 13 includes an element substrate on which pixel switching elements each including TFT or the like, data lines, and scanning lines are formed. The pixel switching elements, the data lines, and the scanning lines are not shown in FIG. 1. Furthermore, a lower polarizing plate 28 is provided on the outer surface of the lower substrate 13, and a conventional retardation plate is not provided.

On the other hand, a common electrode 32 including a transparent conductive film of ITO or the like, an alignment film 33 including polyimide or the like are laminated in order on the inner surface of the upper substrate 14 including a light transmitting material, such as glass or plastic. Also, an upper polarizing plate 36 is provided on the outer surface of the upper substrate 14, and a related art retardation plate is not provided. Although not shown in the drawing, a color filter including dye layers of R (red), G (green) and B (blue) is provided on the inner surface of the upper substrate.

In the liquid crystal layer 16 sandwiched between the upper substrate 14 and the lower substrate 13, the retardation layer 20 and the protective layer 21 are provided only in the reflective display regions R to project toward the liquid crystal layer 16, so that the thickness of the liquid crystal layer in the reflective display regions R is different from that in the transmissive display regions T. In this exemplary embodiment, the thickness of the protective layer 21 is about 4 times as large as that of the retardation layer 20, and thus the thickness of the liquid crystal layer 16 is mainly controlled by the thickness of the protective layer 21. More specifically, the thickness of the liquid crystal layer 16 in the transmissive display regions T is about twice as large as that in the reflective display regions R. Also, a positive crystal material is used for the liquid crystal layer 16, and the refractive index anisotropy $\Delta n$ and thickness d of the liquid crystal layer are controlled so that with the selective voltage applied (voltage turned on), the liquid crystal molecules rise along the direction of an electric field to cause a phase shift of 0 in the liquid crystal layer 16 in both the reflective display regions R and the transmissive display regions T, while with the non-selective voltage applied (voltage tuned off), the liquid crystal molecules lie to cause a phase shift of a quarter wavelength in the liquid crystal layer 16 in the reflective display regions R, and a phase shift of a half wavelength in the liquid crystal layer 16 in the transmissive display regions T. The rubbing axis of the upper substrate 14 is perpendicular or parallel to the transmission axis of the upper polarizing plate 36, and the liquid crystal molecules of the liquid crystal layer 16 are twisted by 90° between the upper substrate 14 and the lower substrate 13 when the non-selective voltage is applied.

The back light 12 includes a light source 37, a reflective plate 38, and a light guide plate 39, and a reflective plate 40 is provided on the bottom (opposite to the liquid crystal panel 1 side) of the light guide plate 39, to emit light transmitted through the light guide plate 39 to the liquid crystal cell 11.

Next, the display principle of the liquid crystal display device 10 of this exemplary embodiment is described below with reference to FIG. 2.

First, in a dark display, a voltage is applied to the liquid crystal layer 16 (with the selective voltage applied) to cause a phase shift of 0 (no phase shift) in the liquid crystal layer 16. In the reflective display, light incident on the upper polarizing plate 36 from above passes through the upper polarizing plate 36 to become linearly polarized light perpendicular to the drawing on the assumption that the transmission axis of the upper polarizing plate 36 is perpendicular to the drawing, and then passes through the liquid crystal layer 16 without any change. The linearly polarized light perpendicular to the drawing is provided with a retardation of a quarter wavelength by the retardation layer 20 provided on the lower substrate 13. After passing through the retardation layer 20, the linearly polarized light becomes counterclockwise circularly polarized light. Next, the circularly polarized light is reflected by the surface of the transflective layer 18 to become clockwise circularly polarized light due to the inversion of the rotational direction, and then again passes through the retardation layer 20 to become linearly polarized light parallel to the drawing. The linearly polarized light then passes through the liquid crystal layer 16 without any change. Since the upper polarizing plate 36 has the transmission axis perpendicular to the drawing, the linearly polarized light parallel to the drawing is absorbed by the upper polarizing plate 36 without being returned to the outside (observation side), thereby creating a dark display.

On the other hand, in the transmissive display, light emitted from the back light 12 passes through the lower polarizing plate 28 to become linearly polarized light parallel to the drawing on the assumption that the transmission axis of the lower polarizing layer 28 is parallel to the drawing, and then passes through the liquid crystal layer 16 without any change. The light is absorbed by the upper polarizing plate 36 to create a dark display in the same manner as the reflective mode.

Next, in a light display, a voltage is not applied to the liquid crystal layer 16 (with the non-selective voltage applied) to cause a phase shift of a quarter wavelength in the reflective display regions R and a phase shift of a half wavelength in the transmissive display regions T. In the reflective display, light passes through the upper polarizing plate 114 to become linearly polarized light perpendicular to the drawing, and then passes through the liquid crystal layer 16 to be provided with a phase shift of a quarter wavelength by the liquid crystal layer 16. When the linearly polarized light passing through the liquid crystal layer 16 reaches the surface of the retardation layer 20, it becomes counterclockwise circularly polarized light. Then, the circularly polarized light passes through the retardation layer 20 to become linearly polarized light parallel to the drawing, and is then reflected by the surface of the transflective layer 18 while maintaining its polarizing state. Then, the light again passes through the retardation layer 20 to return to counterclockwise circularly polarized light. Next, the light again passes through the liquid crystal layer 16 to return to linearly polarized light perpendicular to the drawing, and then passes through the upper polarizing plate 36 having the transmission axis perpendicular to the drawing to return to the outside (observation side), thereby creating a light display.

On the other hand, in the transmissive display, light emitted from the back light 12 passes through the lower polarizing plate 28 to become linearly polarized light parallel to the drawing, and is then provided with a phase shift of a half wavelength due to the rotatory performance possessed by the liquid crystal layer 16. When the light passes through the liquid crystal layer 16, it becomes linearly polarized light perpendicular to the drawing. The light then passes through the upper polarizing plate 36 having the transmission axis perpendicular to the drawing to return to the outside, thereby creasing a light display.

In the transmissive display, a part of the linearly polarized light parallel to the drawing, which passes through the lower polarizing plate 28, is reflected by the back of the transflective layer 18, passes through the lower polarizing plate 28 to return to the back light 12, and is reflected by the reflective plate 40 provided on the bottom of the back light 12 to be again emitted to the liquid crystal cell 11. Therefore, the light reflected by the back of the transflective layer 18 can be again utilized to contribute to the transmissive display.

In the liquid crystal display device 10 of this exemplary embodiment, the retardation layer 20 having a retardation of a quarter wavelength is provided only in the reflective display regions R of the inner surface of the lower substrate 13, and the thickness of the liquid crystal layer 16 in the transmissive display regions T is about twice as large as that in the reflective display regions R. Furthermore, with no voltage applied, the phase shifts of the liquid crystal layer 16 in the reflective display regions R and the transmissive display regions T are a quarter wavelength and a half wavelength, respectively. Therefore, the transmissive display can be performed by using only linearly polarized light, thereby eliminating the need for the retardation plates provided on the top and bottom of the liquid crystal cell used in the related art device shown in FIG. 7.

In this construction, it is possible to simultaneously address or solve both the problem of a related art construction in which about a half of circularly polarized light incident from the liquid crystal layer side is absorbed by the upper polarizing plate to darken the transmissive display, and the problem in which illumination light reflected by the back of the transflective layer is absorbed by the lower polarizing plate to fail to re-use the light for a display. Therefore, the transmissive display can be brightened, as compared with a related art display. In this embodiment, particularly, when the retardation in the transmissive display regions T is twice as large as that in the reflective display regions R, polarized light before passing through the upper polarizing plate 36 can be set to linearly polarized light in the same direction in the reflective display and the transmissive display. It is thus possible to enhance the utilization efficiency of light, and achieve a construction capable of a brightest transmissive display. Also, a display with a high contrast can be achieved. Particularly, in this exemplary embodiment, the transmissive display is a TN mode display using linearly polarized light, thereby enhancing the utilization efficiency of light, permitting a light display, and widening the viewing angle. Furthermore, even when the cell thickness in the transmissive display regions varies and significantly increases to be twice or more (for example, 3 or 4 times) as large as the cell thickness in the reflective display regions, a high-contrast display can be performed because rotatory performance is utilized.

In this exemplary embodiment, the retardation layer 20 includes the polymer liquid crystal, and an insulating film is formed on the retardation layer 20 so as to function as the protective film 21, thereby reducing or preventing deterioration in the retardation layer 20. Also, the retardation layer 20 is provided only in the reflective display regions R, and thus the protective layer 21 formed on the retardation layer 20 permits the realization of a structure in which the thickness of the liquid crystal layer 16 in the reflective display regions R is smaller than that in the transmissive display regions T. Furthermore, an outer retardation plate need not be provided to simplify the structure, as compared with a related art construction. Therefore, the number of components can be decreased, and the display device can be thinned.

Figure 13:
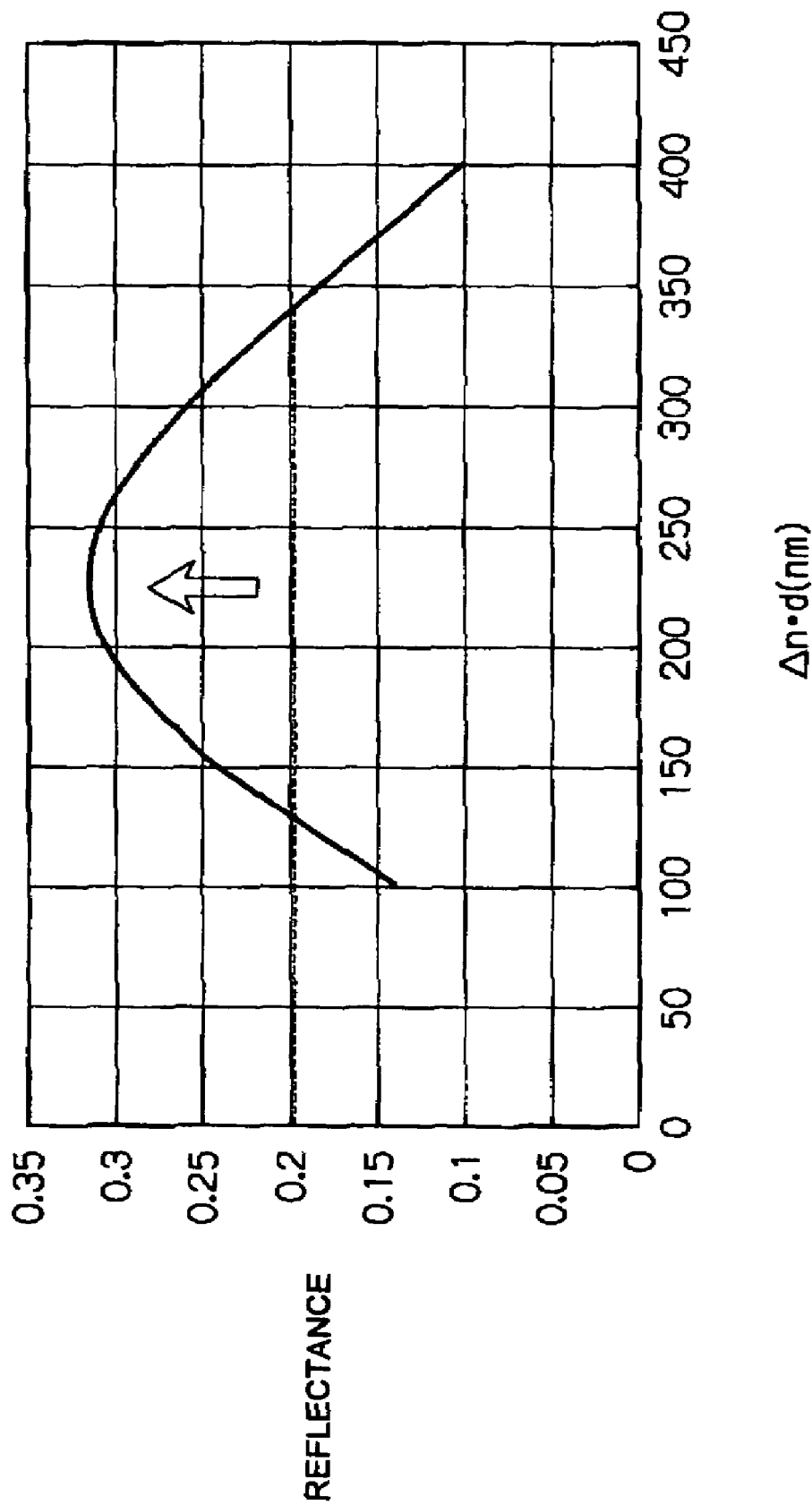
FIG. 13 is a graph showing the results of simulation for measuring a correlation between $\Delta n \cdot d$ and reflectance in a reflective display region of a liquid crystal display device of the present invention.

The inventors determined, by simulation, the correlation between the phase difference (retardation R=Δn·d) and reflectance in the reflective display regions of the liquid crystal display device of this exemplary embodiment. FIG. 13 shows the simulation results. In FIG. 13, Δn·d [nm] is shown on the abscissa, and reflectance [—] is shown on the ordinate. In this exemplary embodiment, the transmissive display is a TN mode display to enhance the utilization efficiency of light and permits a light display. On the other hand, at least a reflectance of 20% or more is required to achieve necessary brightness for the reflective display in practical use. In order to obtain this level of reflectance, the retardation (Δn·d) in the reflective display regions must be set in the range of 130 nm≦Δn·d<340 nm. By setting Δn·d in the reflective display regions to satisfy the condition, the visibility of the reflective display can also be secured.

Second Exemplary Embodiment

A second exemplary embodiment of the present invention is described below with reference to FIG. 3.

Figure 3:
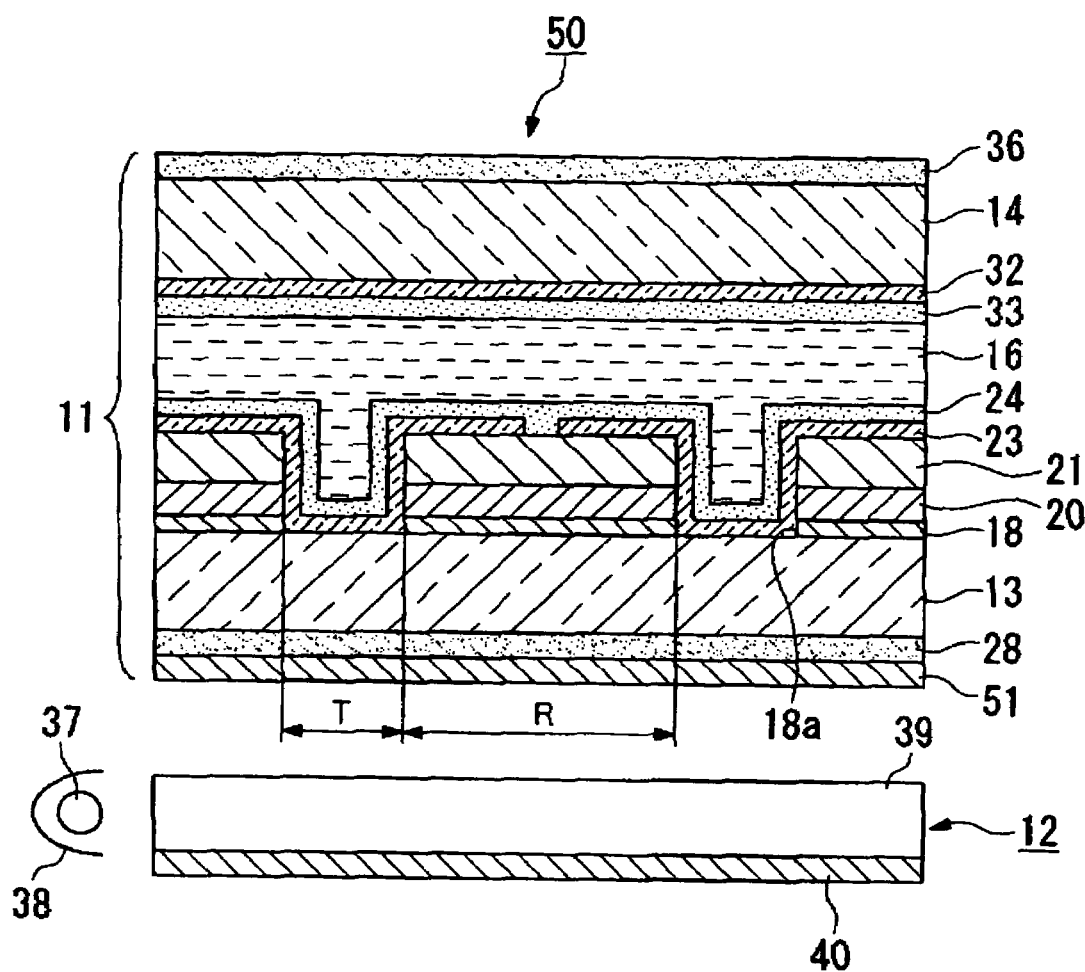
FIG. 3 is a sectional view showing the schematic construction of a liquid crystal display device according to a second exemplary embodiment of the present invention.

FIG. 3 is a sectional view showing the schematic construction of a liquid crystal display device of this exemplary embodiment. The liquid crystal display device of this exemplary embodiment has the same basic construction as the first exemplary embodiment, but is different in that a reflective polarizing plate is added to the outer surface of a lower substrate. Therefore, in FIG. 3, the components common to those in FIG. 1 are denoted by the same reference numerals, and a detail description thereof is omitted.

As shown in FIG. 3, the liquid crystal display device 50 of this exemplary embodiment includes a reflective polarizing plate 51 provided on the outer side of the lower substrate 13, and more specifically, provided on the outer side of the lower polarizing plate 28. The reflective polarizing plate 51 has a transmission axis of linearly polarized light in a predetermined direction, and the function to reflect linearly polarized light in a direction perpendicular to the transmission axis. The reflective polarizing plate 51 is disposed so that its transmission axis is substantially parallel to the transmission axis of the lower polarizing plate 28. As the reflective polarizing plate 51, for example, D-BEF (trade name, produced by Sumitomo 3M Ltd.), PCF (trade name, produced by Nitto Denko Corporation and disclosed in Japanese Unexamined Patent Application Publication No. 10-319235), or the like can be used.

The liquid crystal display device 50 of this exemplary embodiment can exhibit the same effect as the first exemplary embodiment which is capable of brightening the transmissive display, achieving a high contrast display, decreasing the number of components, and thinning the device in comparison to a related art display device.

In the first exemplary embodiment, in the transmissive display, when light emitted from the back light 12 is incident on the lower polarizing plate 28, only linearly polarized light matching with the transmission axis of the lower polarizing plate 28 is transmitted, and other linearly polarized light is absorbed and cannot be used for a display. On the other hand, in this exemplary embodiment, light emitted from the back light 12 is incident on the reflective polarizing plate 51 before being incident on the lower polarizing plate 28, and thus linearly polarized light, which is absorbed by the lower polarizing plate 28 in the first exemplary embodiment, is reflected by the reflective polarizing plate 51 before absorption, and can thus be re-used for the transmissive display. Therefore, in the construction of this exemplary embodiment, in the transmissive display, the effect of reducing or preventing the light emitted from the back light 12 from being absorbed by the lower polarizing plate 28 is combined with the same effect as the first exemplary embodiment, i.e., the effect of reducing or preventing the light passing through the liquid crystal layer 16 from being absorbed by the upper polarizing plate 36, and the effect of permitting the re-utilization of light reflected by the back of the transflective layer 18 for a display. As a result, the transmissive display can be further brightened in comparison with the first exemplary embodiment.

Third Exemplary Embodiment

A third exemplary embodiment of the present invention is described below with reference to FIG. 9.

FIG. 3 is a sectional view showing the schematic construction of a liquid crystal display device of this exemplary embodiment. The liquid crystal display device of this exemplary embodiment has the same basic construction as the first exemplary embodiment, but is different in that a color filter for each of a reflective display and a transmissive display is provided on a lower substrate. Therefore, in FIG. 9, the components common to those in FIG. 1 are denoted by the same reference numerals, and a detail description thereof is omitted.

Figure 9:
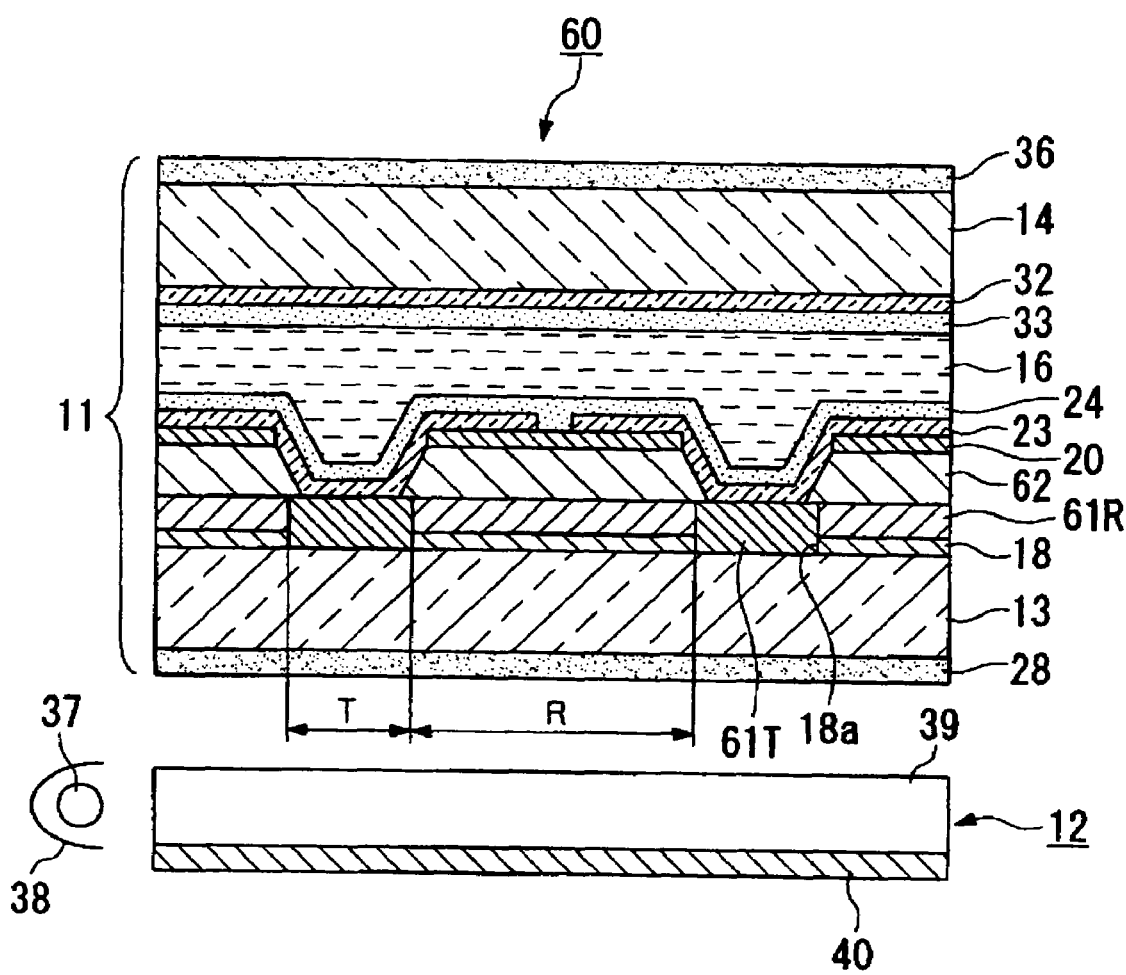
FIG. 9 is a sectional view showing the schematic construction of a liquid crystal display device according to a third exemplary embodiment of the present invention.

As shown in FIG. 9, a liquid crystal display device 60 of this exemplary embodiment includes a transflective layer 18 having transmission apertures 18a and provided on the inner surface of the lower substrate 13, a reflective display color filter which is formed on the transflective layer 18 and which has a dye layer 61R formed in the reflective display regions R, and a transmissive display color filter having a dye layer 61T formed in the apertures 18a corresponding to the transmissive display regions T. The dye layer 61R of the reflective display color filter is controlled to have lower chroma than that of the dye layer 61T of the transmissive display color filter. Also, an insulating layer 62 including an acrylic resin or the like is formed on the dye layer 61R of the reflective display color filter so as to function as a liquid crystal layer thickness controlling layer to decrease the thickness of the liquid crystal layer in the reflective display regions R as compared with that in the transmissive display regions T. Furthermore, the same retardation layer 20 as in the first embodiment is formed on the insulating layer 62, and the pixel electrodes 23 and the alignment film 24 are laminated in turn on the retardation layer 20. The construction formed on the upper substrate 14 is the same as in the first and second exemplary embodiments.

The liquid crystal display device 60 of this exemplary embodiment can exhibit the same effect as the first and second exemplary embodiments which are capable of brightening the transmissive display, achieving a high contrast display, decreasing the number of components, and thinning the device in comparison to a related art display device. Furthermore, in the liquid crystal display device 60 of this exemplary embodiment, light passes twice through the color filter in the reflective display regions R, while light passes once through the color filter in the transmissive display regions T. Therefore, if the same color filter is used for the reflective display regions R and the transmissive display regions T, the color of the reflective display is darker than that of the transmissive display to deteriorate a chroma balance. However, in this exemplary embodiment, both the reflective display color filter and the transmissive display color filter are used, and the chroma of the dye layer 61R of the reflective display color filter is set to be lower than that of the dye layer 61T of the transmissive display color filter, thereby enhancing a chroma balance between the display colors of the reflective display and the transmissive display.

Fourth Exemplary Embodiment

A fourth exemplary embodiment of the present invention is described below with reference to FIG. 10.

Figure 10:
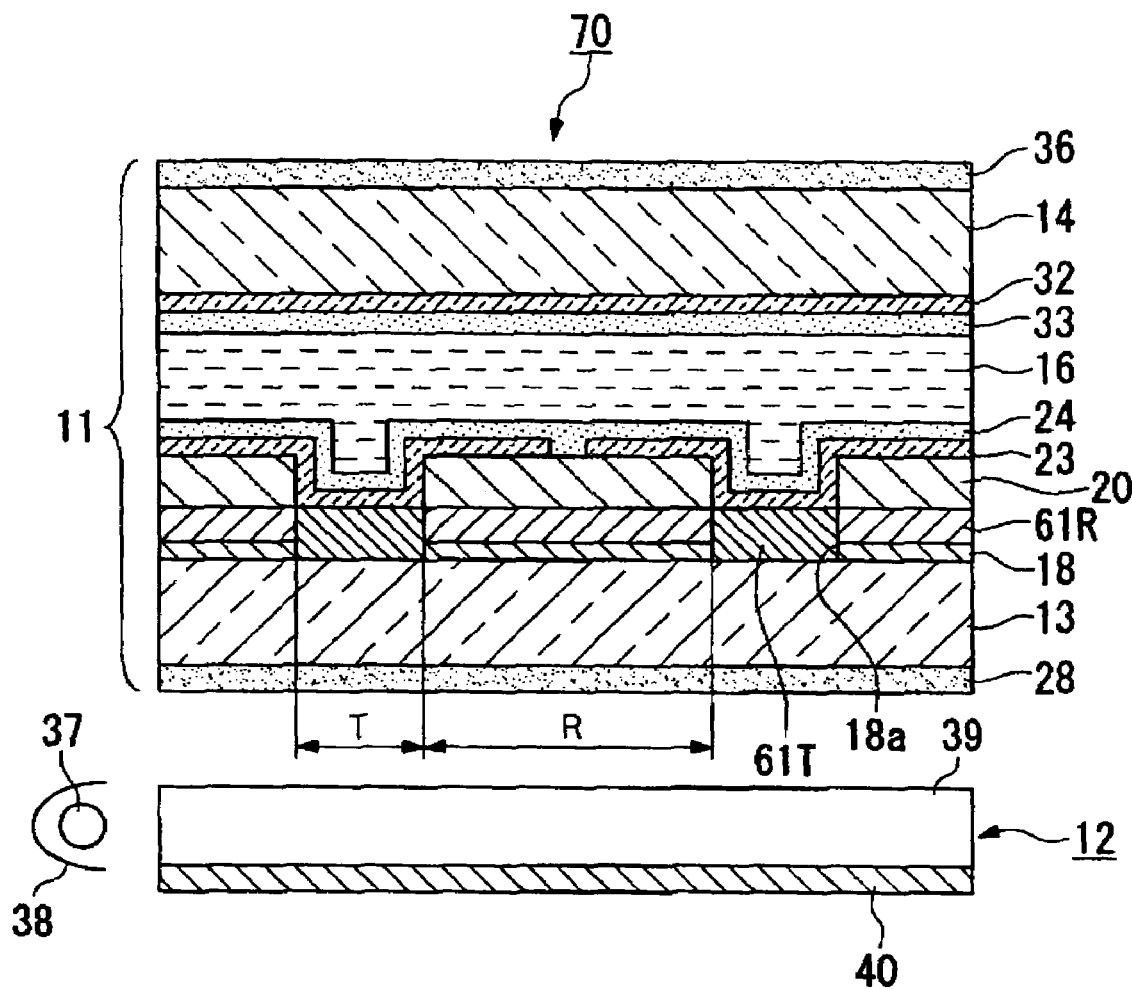
FIG. 10 is a sectional view showing the schematic construction of a liquid crystal display device according to a fourth exemplary embodiment of the present invention.

FIG. 10 is a sectional view showing the schematic construction of a liquid crystal display device of this exemplary embodiment. The liquid crystal display device of this exemplary embodiment has the same basic construction as the first exemplary embodiment, but is different in that an insulating layer is not provided on a lower substrate. Therefore, in FIG. 10, the components common to those in FIG. 1 are denoted by the same reference numerals, and a detail description thereof is omitted.

As shown in FIG. 10, a liquid crystal display device 70 of this exemplary embodiment includes a transflective layer 18 provided on the inner surface of the lower substrate 13, a dye layer 61R of a reflective display color filter formed on the transflective layer 18, which corresponds to the reflective display region R, and a dye layer 61T of a transmissive display color filter formed in the apertures 18a which correspond to the transmissive display regions T. The dye layer 61R of the reflective display color filter is controlled to have lower chroma than that of the dye layer 61T of the transmissive display color filter. This construction is the same as in the third exemplary embodiment. Also, the retardation layer 20 is formed on the dye layer 61R of the reflective display color filter so as to function as a liquid crystal layer thickness controlling layer to decrease the thickness of the liquid crystal layer in the reflective display regions R as compared with that in the transmissive display regions T. Furthermore, the pixel electrodes 23 and the alignment film 24 are laminated in turn on the retardation layer 20. The construction formed on the upper substrate 14 is the same as in the first to third exemplary embodiments.

The liquid crystal display device 70 of this exemplary embodiment can exhibit the same effect as the above-described exemplary embodiment which is capable of brightening the transmissive display, achieving a high contrast display, decreasing the number of components, thinning the device, and enhancing a chroma balance between the display colors of the reflective display and the transmissive display in comparison to a related art display device. Furthermore, in this embodiment, the retardation layer 20 also functions as the liquid crystal layer thickness controlling layer to eliminate the need to form an insulating layer separately, thereby simplifying the manufacturing process, for example, as compared with the third exemplary embodiment.

Figure 11:
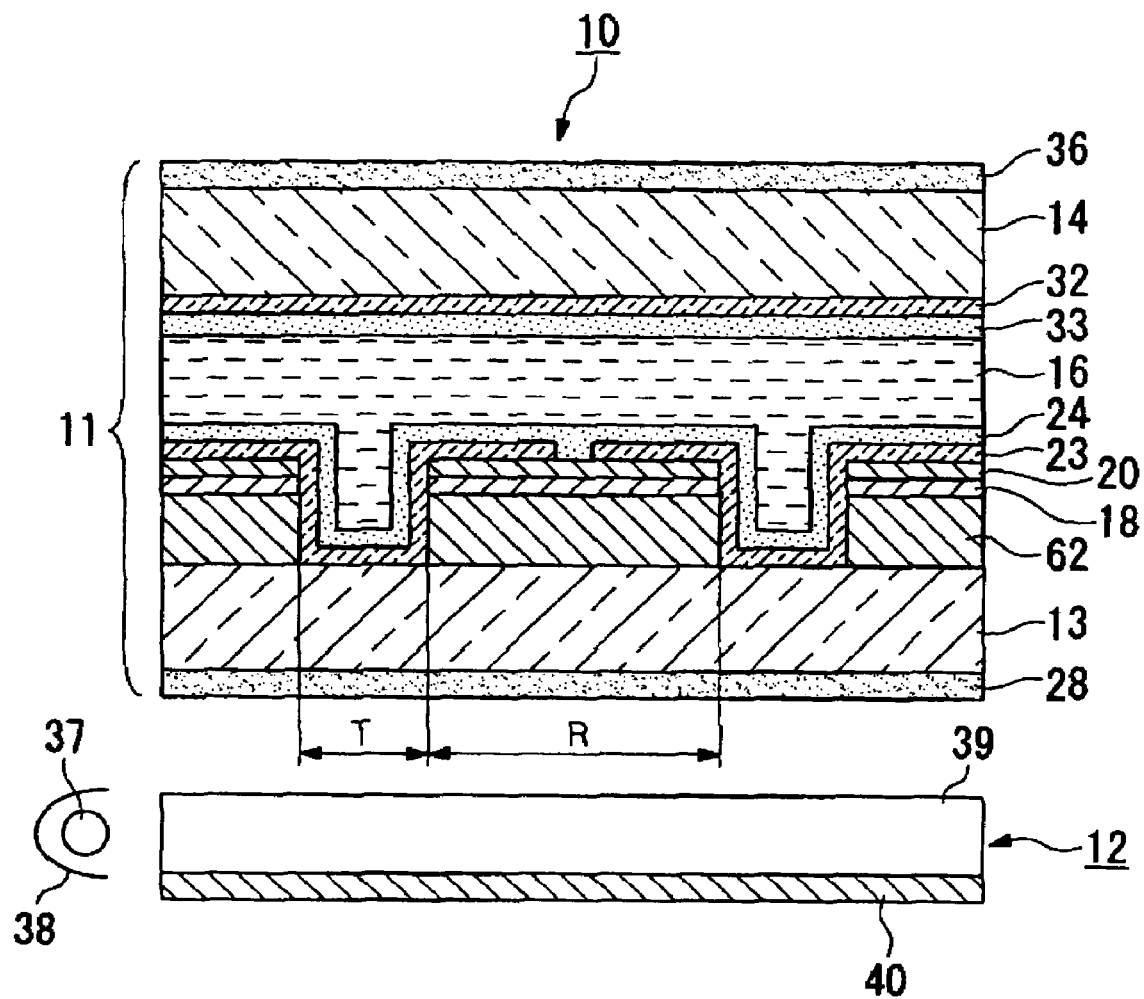
FIG. 11 is a sectional view showing the schematic construction of a liquid crystal display device according to another exemplary embodiment of the present invention.
Figure 12:
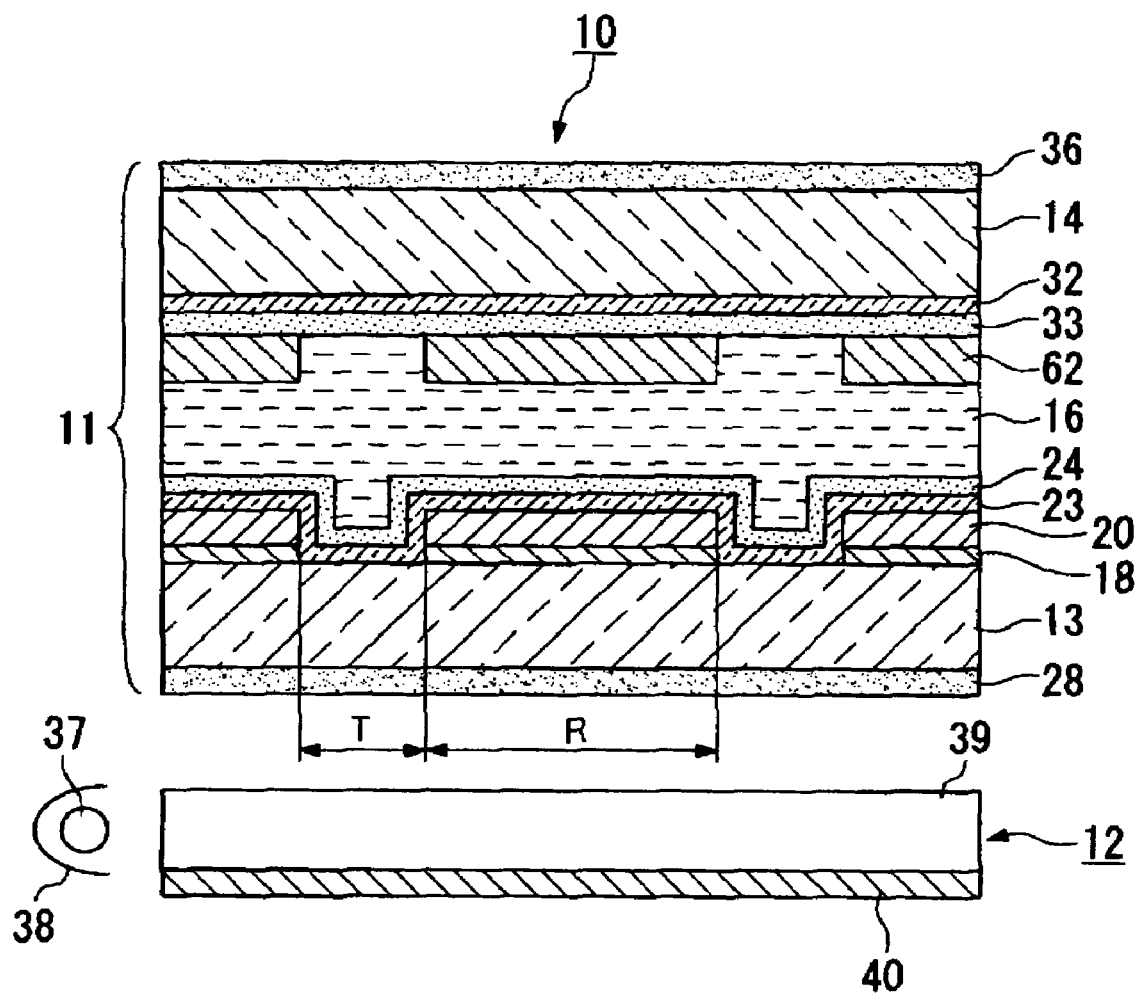
FIG. 12 is a sectional view showing the schematic construction of a liquid crystal display device according to a further exemplary embodiment of the present invention.

With respect to the positional relation between the transflective layer and the insulating layer functioning as the liquid crystal layer thickness controlling layer, the transflective layer 18 may be formed on an insulating layer 62, and the retardation layer 20 may be formed on the transflective layer 18, as shown in FIG. 11. Alternatively, as shown in FIG. 12, the transflective layer 18 and the retardation layer 20 may be formed on the lower substrate 13 side, and the insulating layer 62 may be formed on the upper substrate 14 side.

[Exemplary Electronic Apparatus]

An example of an electronic apparatus including the liquid crystal display device of any one of the above-described exemplary embodiment is described below.

Figure 4:
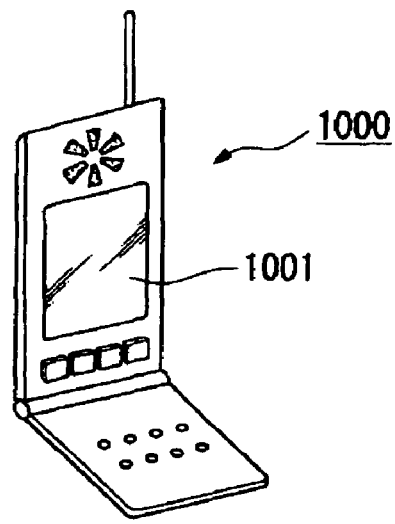
FIG. 4 is a perspective view showing an example of an electronic apparatus according to the present invention.

FIG. 4 is a perspective view showing an example of a cellular phone. In FIG. 4, reference numeral 1000 denotes a cellular phone body, and reference numeral 1001 denotes a liquid crystal display part using the liquid crystal display device.

Figure 5:
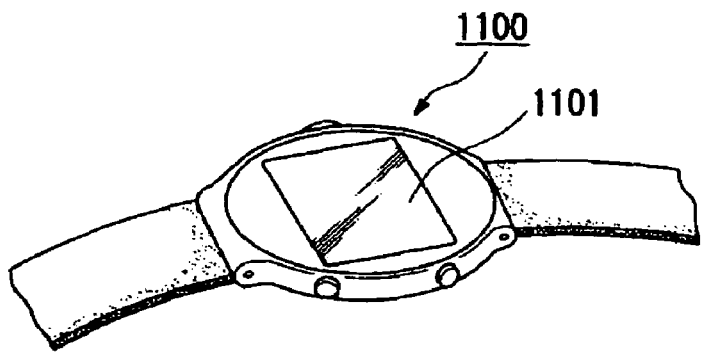
FIG. 5 is a perspective view showing another example of an electronic apparatus according to the present invention.

FIG. 5 is a perspective view showing an example of a wristwatch electronic apparatus. In FIG. 5, reference numeral 1100 denotes a watch body, and reference numeral 1101 denotes a liquid crystal display part using the liquid crystal display device.

Figure 6:
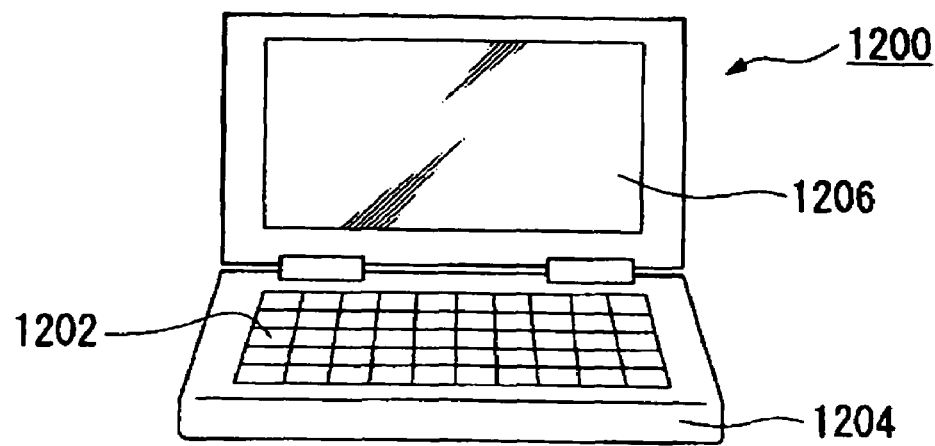
FIG. 6 is a perspective view showing a further example of an electronic apparatus according to the present invention.

FIG. 6 is a perspective view showing an example of portable information processors such as a word processor, a personal computer, and the like. In FIG. 6, reference numeral 1200 denotes an information processor; reference numeral 1202, an input part, such as keyboard or the like; reference numeral 1204, an information processor body; and reference numeral 1206, denotes a liquid crystal display part using the liquid crystal display device.

Each of the electronic apparatuses shown in FIGS. 4 to 6 includes the liquid crystal display part using the liquid crystal display device of any one of the above exemplary embodiments to realize an electronic apparatus having a display part capable of achieving a bright display in the transmission mode.

The technical field of the present invention is not limited to the above-described exemplary embodiments, and various changes can be made in the scope of the gist of the present invention. For example, in the above exemplary embodiments, the retardation layer has a retardation of a quarter wavelength in the reflective display regions, and the thickness of the liquid crystal layer in the transmissive display regions is twice as large as that in the reflective display regions so that with the selective voltage applied, the phase shift of the liquid crystal layer is 0 in both the reflective display regions and the transmissive display regions, while with the non-selective voltage applied, the phase shifts of the liquid crystal layer in the reflective display regions and the transmissive display regions are a quarter wavelength and a half wavelength, respectively. By setting such conditions, a structure can be formed in which the transmissive display can be made brightest, and the contrast can be most enhanced. However, the phase shift of each region is not necessarily set to the above conditions. Also, a phase shift may be applied only to at least the reflective display regions, and the phase shift in the transmissive display regions may be greater than that in the reflective display regions in order to decrease the phase shift in the reflective display regions. In this construction, the transmissive display can be made brighter than at least a conventional display device.

Furthermore, in the above-described exemplary embodiments, a positive liquid crystal is used and aligned horizontally in an initial state so that with the voltage applied, the phase shift is 0, while with no voltage applied, the phase shifts in the reflective display regions and the transmissive display regions are a quarter wavelength and a half wavelength, respectively. However, conversely, a negative liquid crystal may used and aligned vertically in an initial state so that with no voltage applied, the phase shift is 0, while with the voltage applied, the phase shifts in the reflective display regions and the transmissive display regions are a quarter wavelength and a half wavelength, respectively. Furthermore, a liquid crystal display device is not limited to a transflective color liquid crystal display device in an active matrix system according to the above embodiments, and the present invention can also be applied to passive matrix-system and monochrome display liquid crystal display devices.

EXAMPLES

In order to prove the effect of the present invention, the inventors actually formed a liquid crystal display device having a construction according to the present invention, and measured transmittance and reflectance. The results are described below.

A liquid crystal display device having a construction according to the exemplary embodiment shown in FIG. 1 was formed as a liquid crystal display device of Example 1. A panel had a construction in which the number of dots was 160×(120×3 (RGB)), the dot pitch was 240 μm×(80 μm×3 (RGB)), and an aperture serving as a transmissive display region had an area of 68 μm×22 μm (however, two apertures were formed in one dot).

A liquid crystal display device of Example 2 includes a panel having the same construction as the liquid crystal display device of Example 1, and a reflective polarizing plate provided on the outer side of a lower polarizing plate (corresponding to the liquid crystal display device of the second embodiment shown in FIG. 3).

Figure 7:
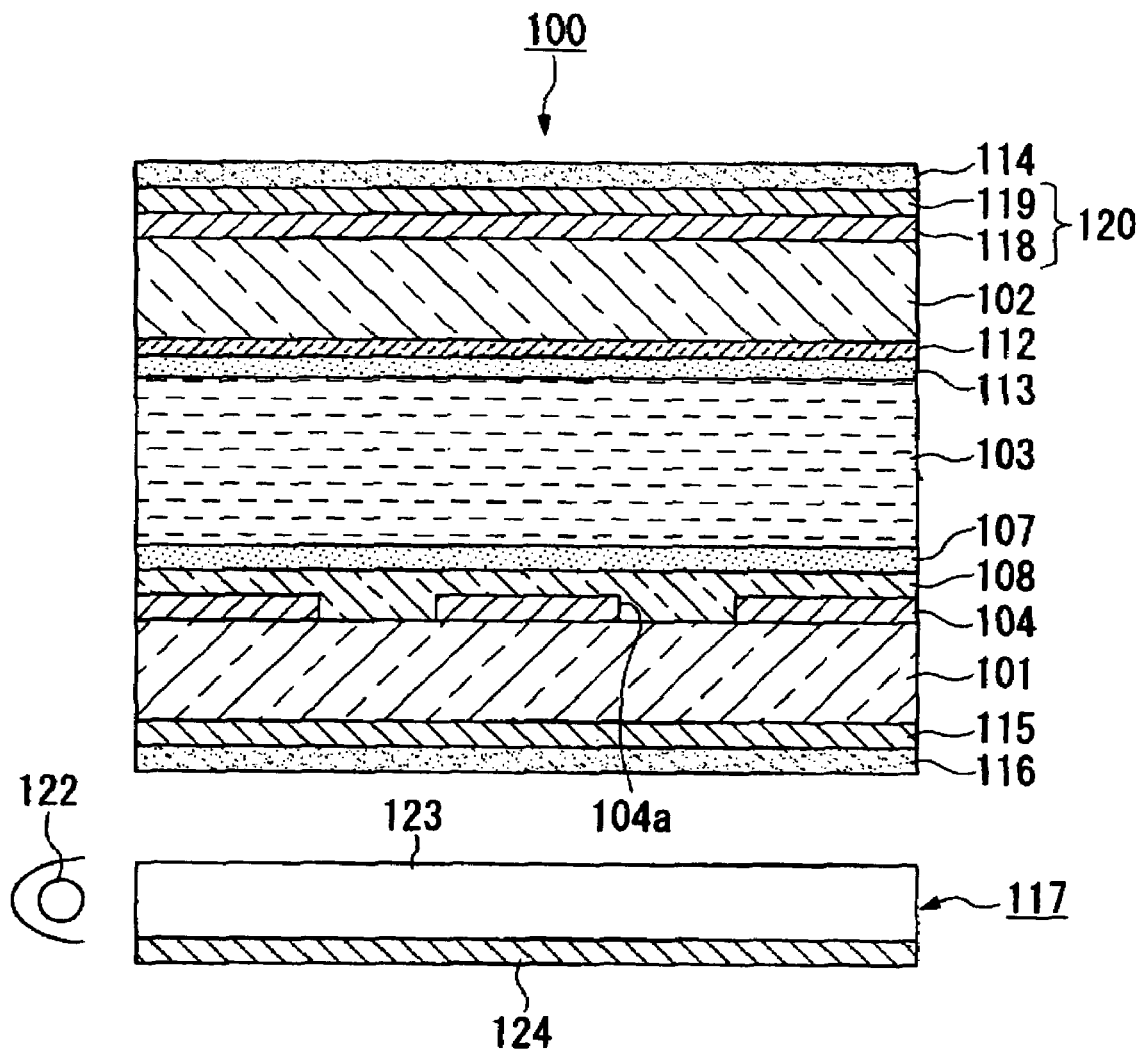
FIG. 7 is a sectional view showing the schematic construction of an example of related art liquid crystal display devices.
Figure 8:
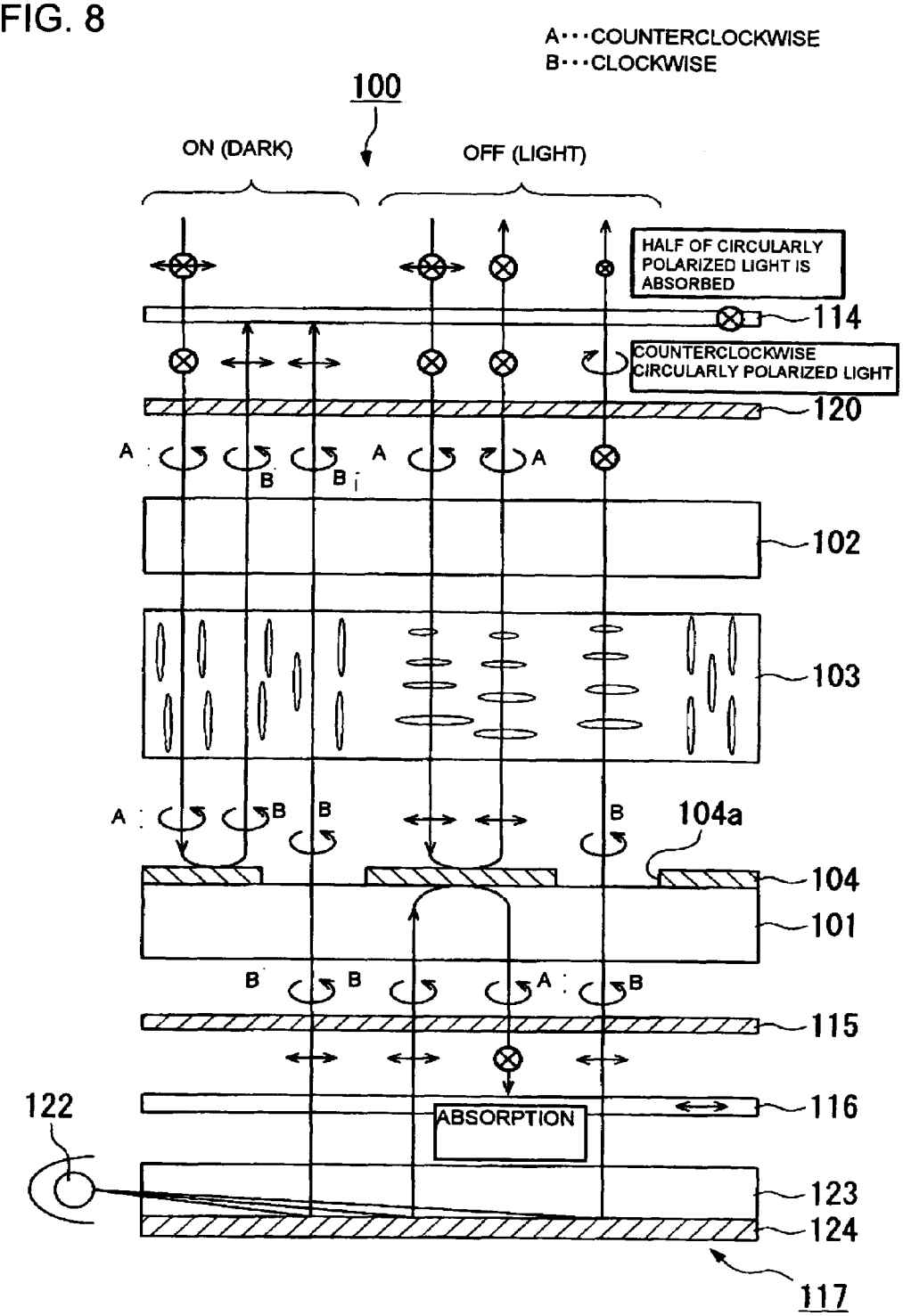
FIG. 8 is a schematic showing only components necessary for illustrating the display principle of the related art liquid crystal display device.

A liquid crystal display device having the same construction as the related art display device shown in FIG. 7 was formed as a liquid crystal display device of Related Art Example 1. The construction of a panel was the same as the liquid crystal display device of Example 1.

A liquid crystal display device of Related Art Example 2 includes a panel having the same construction as the liquid crystal display device of Related Art Example 1, and a reflective polarizing plate provided on the outer side of a lower polarizing plate.

The transmittance and reflectance of each of these four samples were measured under predetermined conditions. The results are shown in Table 1.

TABLE 1

| Construction | Related Art Example 1 | Related Art Example 2 | Example 1 | Example 2 |
| --- | --- | --- | --- | --- |
| Transmittance (%) | 1.4 | 2.4 | 4.3 | 7.5 |
| Reflectance (%) | 30 | 30 | 31 | 31 |

Table 1 indicates that the four samples have no significant difference in reflectance, and it is thus said that a liquid crystal display device of the present invention exhibits the same level of brightness in a reflective display as a Related Art display. On the other hand, in comparison between Comparative Example 1 and Example 1 and between Comparative Example 2 and Example 2, 1.4% of transmittance in Related Art Example 1 increases to 4.3% of transmittance in Example 1, and 2.4% of transmittance in Related Art Example 2 increases to 7.5% of transmittance in Example 2. Namely, in both Examples 1 and 2, the transmittance increases by about 3 times. These results prove that the construction of the present invention has the effect of reducing or preventing light passing through a liquid crystal layer from being absorbed by an upper polarizing plate, and the effect of permitting the re-use of light reflected by the back of a transflective layer, thereby brightening the transmissive display by about 3 times while maintaining the brightness of the reflective display in comparison to a related art display device.

In comparison between Examples 1 and 2, 4.3% of transmittance in Example 1 increases to 7.5% of transmittance in Example 2. These results prove that the utilization efficiency of light emitted from a back light can be enhanced by inserting the reflective polarizing plate between the back light and the lower polarizing plate, to further brighten the transmissive display.

As described in detail above, the construction of the present invention eliminates the need for an upper retardation plate used in a related art device, and can thus address or solve the problem of the related art device in which about a half of circularly polarized light passing through a liquid crystal layer is absorbed by the upper polarizing plate to darken a transmissive display. Also, the present invention has the effect of permitting the re-use of light reflected by the bottom of a transflective layer to brighten the transmissive display while maintaining the brightness of a reflective display. It is also possible to simplify the structure and thin a liquid crystal display device, as compared with a related art display device.

What is claimed is:

1. A liquid crystal display device comprising:
   a first substrate;
   a second substrate opposing the first substrate;
   a dot region having a transmissive display region and a reflective display region;
   a liquid crystal layer interposed between the first and second substrates, the liquid crystal layer having a thickness in the transmissive display region that is greater than the thickness of the liquid crystal layer in the reflective display region;
   a reflective layer provided at the reflective display region in between the first substrate and the liquid crystal layer; and
   a retardation layer provided in between the reflective layer and the second substrate, the retardation layer overlapping the reflective display region and not overlapping the transmissive display region in plan view.

2. The liquid crystal display device according to claim 1, the retardation layer giving transmitted light a phase shift of about a quarter wavelength, and the thickness of the liquid crystal layer in the transmissive display regions being about twice as large as the thickness in the reflective display regions.

3. The liquid crystal display device according to claim 2, further comprising a liquid crystal layer thickness controlling layer on the retardation layer that contributes to make the liquid crystal layer thicker in the transmissive display region than in the reflective display region.

4. The liquid crystal display device according to claim 2, the retardation layer functioning as a liquid crystal layer thickness controlling layer that contributes to make the liquid crystal layer thicker in the transmissive display region than in the reflective display region.

5. The liquid crystal display device according to claim 1, an aperture being opened in the reflective layer, the retardation layer overlapping the reflective display region and not overlapping the aperture in plan view.

6. The liquid crystal display device according to claim 1, the retardation layer contributing to make thickness of the liquid crystal layer in the transmissive display region to be greater than the thickness in the reflective display region.

7. The liquid crystal display device according to claim 6, the retardation layer and the liquid crystal layer thickness controlling layer being disposed on opposite sides of the liquid crystal layer.

8. The liquid crystal display device according to claim 1, further comprising a liquid crystal layer thickness controlling layer that overlaps the reflective display region in plan view, the liquid crystal layer thickness controlling layer making thickness of the liquid crystal layer to be thicker in the transmissive display region than in the reflective display region.

9. The liquid crystal display device according to claim 8, the retardation layer and the liquid crystal layer thickness controlling layer both contributing to make thickness of the liquid crystal layer in the transmissive display region to be greater than the thickness in the reflective display region.

10. The liquid crystal display device according to claim 8, the retardation layer being disposed between the liquid crystal layer and the liquid crystal layer thickness controlling layer.

11. The liquid crystal display device according to claim 8, further comprising a color filter disposed between the liquid crystal layer thickness controlling layer and the corresponding one of the first and second substrates.

12. The liquid crystal display device according to claim 1, further comprising:
    a transmissive display color filter disposed in the transmissive display region; and
    a reflective display color filter disposed in the reflective display region, the retardation layer being disposed between the liquid crystal layer and the reflective display color filter.

13. The liquid crystal display device according to claim 12, further comprising a liquid crystal layer thickness controlling layer that controls thickness of the liquid crystal layer to be thicker in the transmissive display region than in the reflective display region, the liquid crystal layer thickness controlling layer being disposed between the liquid crystal layer and the reflective display color filter.

14. The liquid crystal display device according to claim 1, further comprising a plurality of pixel electrodes, the retardation layer being disposed within a gap between adjacent pixel electrodes.

15. The liquid crystal display device according to claim 14, the reflective layer overlapping the gap between adjacent pixel electrodes.

16. The liquid crystal display device according to claim 1, further comprising a back light that emits light toward the liquid crystal layer, the retardation layer being located between the liquid crystal layer and the back light.

17. The liquid crystal display device according to claim 1, the retardation layer being disposed between the reflective layer and the liquid crystal layer.

18. The liquid crystal display device according to claim 1, further comprising a protection layer disposed between the liquid crystal layer and the retardation layer.

19. A liquid crystal display device comprising:
    a first substrate;
    a second substrate opposing the first substrate;
    a dot region having a transmissive display region and a reflective display region;
    a liquid crystal layer interposed between the first and second substrates, the liquid crystal layer having a thickness in the transmissive display region that is greater than the thickness of the liquid crystal layer in the reflective display region;
    a reflective layer provided at the reflective display region in between the first substrate and the liquid crystal layer;
    a retardation layer provided in between the reflective layer and the second substrate; and
    an aperture being opened in the reflective layer, the retardation layer overlapping the reflective display region and not overlapping the aperture in plan view.

20. A liquid crystal display device comprising:
    a first substrate;
    a second substrate opposing the first substrate;
    a dot region having a transmissive display region and a reflective display region;
    a liquid crystal layer interposed between the first and second substrates, the liquid crystal layer having a thickness in the transmissive display region that is greater than the thickness of the liquid crystal layer in the reflective display region;
    a reflective layer provided at the reflective display region in between the first substrate and the liquid crystal layer; and
    a retardation layer provided in between the reflective layer and the second substrate,
    the retardation layer being disposed between the reflective layer and the liquid crystal layer.

* * * * *